US007599385B1

(12) United States Patent
Andrade et al.

(10) Patent No.: US 7,599,385 B1

(45) Date of Patent: Oct. 6, 2009

(54) METHOD AND APPARATUS FOR PROVIDING COMPOSITE LINK ASSIGNMENT IN NETWORK DESIGN

(75) Inventors: Diogo Andrade, Piscataway, NJ (US); Luciana Buriol, Porto Alegre (BR); Mauricio Guilherme de Carvalho Resende, Holmdel, NJ (US); Mikkel Thorup, Florence, MA (US)

(73) Assignee: AT&T Corp., New York, NY (US)

( * ) Notice: Subject to any disclaimer, the term of this patent is extended or adjusted under 35 U.S.C. 154(b) by 513 days.

(21) Appl. No.: 11/451,189

(22) Filed: Jun. 12, 2006

(51) Int. Cl.

| | |
|---|---|
| ***H04J 3/16*** | (2006.01) |
| ***G06F 11/00*** | (2006.01) |
| ***G06F 15/173*** | (2006.01) |

(52) U.S. Cl. ....................... 370/437; 370/238; 370/256; 370/408; 709/242; 716/13

(58) Field of Classification Search ...... 370/230–238.1, 370/221, 252, 389, 392, 40, 401–410, 431–469; 709/238, 239, 240–243; 716/13

See application file for complete search history.

(56) References Cited

U.S. PATENT DOCUMENTS

| | | | | |
|---|---|---|---|---|
| 4,912,656 A * | 3/1990 | Cain et al. | .................. | 709/242 |
| 6,704,320 B1 * | 3/2004 | Narvaez et al. | ............. | 370/408 |
| 7,362,709 B1 * | 4/2008 | Hui et al. | .................... | 370/237 |

* cited by examiner

*Primary Examiner*—Afsar M. Qureshi

(57) ABSTRACT

A method and apparatus for composite link assignment are provided such that network capacity is sufficient to handle all the traffic (e.g., load) while an objective function, e.g., the total cost of the capacity is minimized. The present method receives a plurality of weights for a plurality of arcs and a load for the network. An objective function is selected for minimization, where the present method then determines the composite link assignment to handle the load while the objective function is minimized. In one embodiment, the composite link assignment comprises a plurality of different link types for the plurality of arcs.

11 Claims, 5 Drawing Sheets

METHOD AND APPARATUS FOR PROVIDING COMPOSITE LINK ASSIGNMENT IN NETWORK DESIGN

The present invention relates generally to communication networks and, more particularly, to a method and apparatus for providing composite link assignment in network design for networks such as the packet networks, e.g., Voice over Internet Protocol (VoIP) and Service over Internet Protocol (SoIP) networks.

BACKGROUND OF THE INVENTION

The Internet has emerged as a critical communication infrastructure, carrying traffic for a wide range of important applications. Internet services such as VoIP and SoIP services are becoming ubiquitous and more and more businesses and consumers are relying on their Internet connections for all voice and data communications. For example, businesses and consumers may connect their routers to the Internet for sending and receiving data packets. In turn, the routers utilize routing protocols to determine a path for sending the data. Internet protocol (IP) traffic follows rules established by routing protocols. Shortest path based protocols, such as Open Shortest Path First (OSPF), direct traffic based on arc weights that are assigned to each arc, e.g., by the network operator. The assigned weights are made known to each router in the network. Each router computes shortest paths and creates destination tables used for routing flow on the shortest paths. Traffic leaving a source router to a destination router is often split among all arcs leaving the source router on the shortest path graph towards the destination router. For example, a router continues to split traffic among all arcs on the shortest path graph even when a path may be congested. In addition, the installed capacity may not be enough to meet the demand during failure scenarios. However, if the capacity is increased well beyond the expected need, then the cost of the network becomes prohibitive and impractical.

Therefore there is a need for a method for providing composite link assignment in network design such that the capacity is enough to handle all the expected traffic while the total cost of the capacity is minimized.

SUMMARY OF THE INVENTION

In one embodiment, the present invention discloses a method and apparatus for providing a composite link assignment in a network design for networks with routing protocols such as shortest path based routing protocols. The composite link assignment is provided such that the capacity is sufficient to handle all the traffic (e.g., load) while an objective function, e.g., the total cost of the capacity is minimized. In one embodiment, the present invention receives a plurality of weights for a plurality of arcs and a load for the network. An objective function is selected for minimization, where the present method then determines the composite link assignment to handle the load while the objective function is minimized. In one embodiment, the composite link assignment comprises a plurality of different link types for the plurality of arcs.

In one embodiment, the heuristic algorithm minimizes the capacity by utilizing an algorithm that uses as much as possible of the biggest capacity link type without exceeding the load. In another embodiment, the heuristic algorithm minimizes the network cost defined by the sum of the costs of every arc. In another embodiment, the heuristic algorithm minimizes the network cost with an additional constraint of using at most a specific number of different link types. In another embodiment, the heuristic algorithm minimizes the number of copies of a link type used to satisfy the load.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing composite link assignment in a network design for networks with routing protocols such as shortest path based protocols. In one embodiment, the composite link assignment is provided such that the capacity is sufficient to handle all the traffic while the total cost of the capacity is minimized. Although the present invention is discussed below in the context of IP networks, the present invention is not so limited. Namely, the present invention can be implemented in any type of networks that may benefit from the present network design method, e.g., a wireless network and the like.

Figure 1:
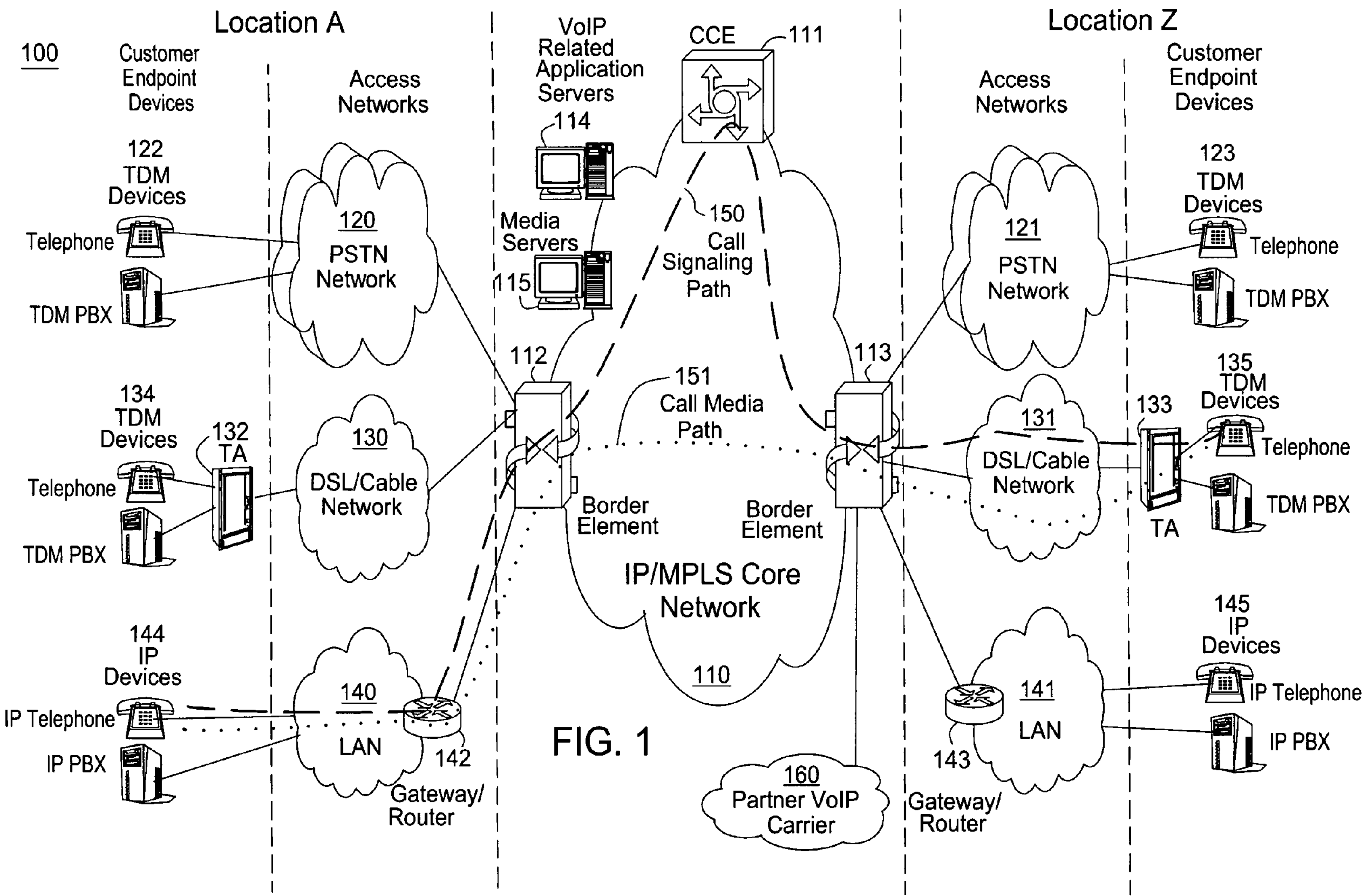
FIG. 1 illustrates an exemplary network related to the present invention.

To better understand the present invention, FIG. 1 illustrates an exemplary network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and/or router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. A customer in location A using any endpoint device type with its associated access network type can communicate with another customer in location Z using any endpoint device type with its associated network type.

Packet network operators, e.g., VoIP or SoIP service providers, must often maintain an efficient network to support the traffic or load that is placed on the network. Namely, the network service providers must balance performance, reliability and cost in maintaining a network structure that is capable of meeting the needs of its customers. FIG. 1 illustrates the complexity in today's networks, where numerous Autonomous Systems (e.g., each of the networks, or a collection of the networks as shown) are communicating with each other using routers and various communication channels or links. In fact, within each Autonomous System, there are numerous communication channels or links that may connect a plurality of core routers, e.g., core routers (not shown) that assist in forwarding packets from BE 112 to BE 113 in core network 110. To ensure reliability, a network service provider may certainly deploy redundant network elements, e.g., additional routers and additional communication channels. However, redundant network elements are costly and will impact a network service provider's ability to compete. Therefore there is a need for a method for providing composite link assignment in network design such that the capacity is sufficient to handle all the traffic while the total cost of the capacity is minimized.

In one embodiment, the present invention provides a method and apparatus for providing composite link assignment in network design that enables a network designer to optimize the weights to be assigned to each arc and the network link types to be deployed such that the capacity is sufficient to move all the traffic while the total cost of the capacity is minimized.

In order to clearly illustrate the present invention, a network topology will first be described. In one embodiment, network topology refers to a set of link types to be deployed between network elements such as routers. For example, International Telecommunications Union (ITU) standards specify optical fiber link types at various data rates, e.g., OC-3 at 155 Mb/s, OC-12 at 622 Mb/s, OC-48 at 2.5 Gb/s, OC-192 at 10 Gb/s, etc. For other transport media such as wireless, co-axial cable, etc. other link types can also be defined. A network topology may have a set of link types having a different capacity to be deployed in order to meet a given demand. Each link type and each arc in the network is assigned weights. For example, a 10 Gb/s arc may be assigned a weight that is twice that of a 2.5 Gb/s arc. In OSPF, each router computes a graph of shortest weight paths from itself to every other router in the network for a given demand. Using such a routing protocol, traffic is routed on the shortest weight paths.

Figure 2:
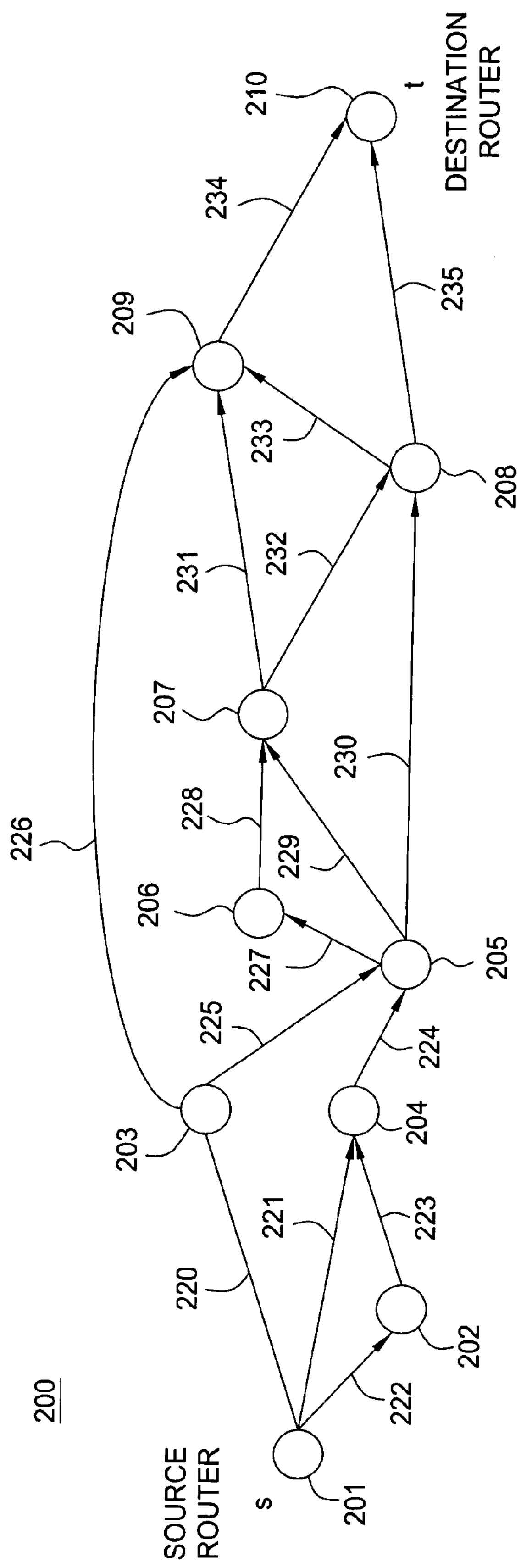
FIG. 2 illustrates an another exemplary network.

FIG. 2 illustrates an exemplary network 200 with routers 201 through 210. Traffic from router 201 towards 210 may use any of the arcs 220 through 235 depending on the weight of each arc. For example, traffic may use arcs 221, 224, 230 and 235. For clarity in the description below, the source router 201 will be referred to as router s and the destination router 210 will be referred to as router t. In one embodiment, traffic leaving router s with destination router t is split among all arcs leaving router s on the shortest path graph from router s to router t. It is desirable to determine a set of OSPF weights that minimize network cost while meeting a given demand. The demand may be selected to accommodate some failure scenarios such as single arc failures, multiple arc failures between same routers, router failures, receiver and transmitter failures, etc.

Mathematically defined, for a given directed network $G=(N, A)$, let N be the set of routers, and A be the set of potential arcs where capacity may be installed. The problem is then determining an optimal set of integer OSPF weights for each link type $w_a \in [1,65535]$, and the number of copies of each link type to be deployed at each arc such that the demand is met while the total cost of the installed capacity is minimized. A demand matrix D specifies the demand between each source and destination router pair. For each source and destination pair of routers $(s, t) \in N \times N$, matrix D has values $D_{s,t}$ specifying the demand between routers s and t. Arc $a \delta A$ has length $d_a$. The link types are numbered 1, 2, . . . T, where link type i has capacity $c_i$ and cost per unit of length $p_i$. For routing purposes, assume that each arc has a single multiplicity, i.e. the installed capacity does not influence routing. Given arc weight assignments and a demand matrix D, OSPF determines the loads on each arc $a \in A$. The total cost of the network is determined by the number of each type of link deployed on each arc in the network.

Initially, the set of assigned weights may be selected at random or weights provided by expert users may be used. In one embodiment, the near-optimal or optimal solution is determined using a genetic algorithm. Many genetic algorithms are known in the art. For example, a US patent application Ser. No. 11/451,190 entitled "Method And Apparatus For Providing A Survivable Network Design", that is filed concurrently with the present application discloses a genetic algorithm that can be used with the present invention, and said application is herein incorporated by reference. However, those skilled in the art will realize that other algorithms may be used to determine the optimal set of weights. If the genetic algorithm is used, the algorithm may work with a population of solutions. Each solution is then represented by a vector of integer weights |A|. At each iteration (or generation) of the genetic algorithm, weights are assigned to the arcs of each member of the population. The genetic algorithm then employs the current invention to determine which links are to be deployed and the corresponding cost associated with the deployment.

In one embodiment, the population in the genetic algorithm evolves using a random keys crossover scheme for sequencing and optimization. For the crossover scheme, the elements (set of weights) are classified according to their cost. For example, x % least-cost solutions (set of weights) are placed in category I, and the y % highest-cost solutions are put in category III. The remaining solutions then fall into category II. The population dynamics for the crossover scheme works as described below. All solutions in the initial population have randomly generated weights. All category I elements are promoted to the next generation unchanged. All category III elements are replaced by random weight elements in the next generation. In one embodiment, the remaining elements of the population of the next generation are created as follows. A solution (parent) is selected at random from the set of categories I solutions. Similarly, a parent is selected at random from the union of the sets of categories II and III. Parents can be selected more than once per generation. A crossover operation is performed on these two parent solutions to produce a child solution. Each weight of the child's arcs is that of the category I parent with probability $\pi (0.5<\pi \leqq 1)$ and that of the other parent with probability $1-\pi$. Each weight is determined independently of each other. The crossovers are repeated until the population of the new generation is of the same size as the current generation.

Given arc weight assignments and a demand matrix D, OSPF determines the loads on each arc $a \in A$. For example, the OSPF weight vector of an element of the population determines a set of loads $l_{ij}$ for each arc (i, j) in the network. To fulfill those loads, it assigns capacities $c_{ij}$ to the arcs, such that $l_{ij} \leqq c_{ij}$. There are many ways to attain a given capacity by composing the various link types. For example, a demand for 10 Gb/s data transmission rate between two routers may be satisfied by providing one arc at 10 Gb/s, 4 arcs at 2.5 Gb/s, and the like. Several different link types that sum up to the desired capacity may be composed as follows: Let, $c_{ij}=\Sigma_{t \text{ used in } (i,j)} m_t c_t$, where $C_t$ is the capacity of link type t and $m_t$ is the number of copies of this link type. "Composite link" refers to a link where the capacity need is met by combining several links that add up to the desired capacity. Recall that given a set of link types {1, 2, . . . , T}, two parameters were defined for each link type i: the capacity $c_i$ and the price per unit of length $p_i$. In one embodiment, it is assumed that price per unit of capacity is smaller for links with greater capacities. In other words, $(p_T/c_T)<(p_{T-1}/c_{T-1})< \ldots <(p_1/c_1)$ forgiven capacities $c_1<c_2< \ldots <c_T$ and prices $p_1<p_2< \ldots <p_T$. The above inequalities take into account the fact that unit cost drops for bigger quantities. In addition, capacities are usually defined as multiples of each other to facilitate hardware development and upgrade. For each capacity $c_i=\alpha c_{i-1}$, the capacities are multiples of each other by powers of $\alpha$, where $(\alpha \in N, \alpha>1)$. The equation defining the capacities as multiples of each other reflects the link types available in real world applications. For instance, link types may be OC-3, OC-12, OC-48, and OC-192 for standard optical fiber transmission with capacities of 155 Mb/s, 622 Mb/s, 2.5 Gb/s, and 10 Gb/s, respectively.

For the above example, the genetic algorithm utilizes the current invention to determine which links are to be deployed and the corresponding cost associated with the deployment for a given set of weights. In one embodiment, the present invention provides various heuristic algorithms to satisfy the load while optimizing an objective function.

In one embodiment, the object function minimizes the capacity (Min capacity) by utilizing a heuristic algorithm that uses as much as possible of the biggest capacity link type without exceeding the load. This means that $\lfloor l/c_T \rfloor$ units of the link T are used. Then, the algorithm updates the remaining load $(l:=l-c_T\lfloor l/c_T \rfloor)$, and repeats the operation on the next link type (T−1), until the link type (1) with smallest capacity is reached. Then, the remaining load is satisfied with $\lceil l/c_1 \rceil$ units of link type 1.

In another embodiment, the objective function minimizes the network cost (Min Cost) defined by the sum of the costs of every arc. When the objective function minimizes the cost, the heuristic algorithm follows the same idea of the Decreasing capacities heuristic, but instead of merely satisfying the load with the last link type, for each step it also stores the price of satisfying the load with the current link type. Once the price information is available for all the solutions, the smallest price configuration is used.

In one embodiment, the object function minimizes the network cost with an additional constraint of using at most k different link types (Min cost k types). The heuristic algorithm follows the same idea of the minimum cost heuristic algorithm but it can use at most k link types. For practical reasons this additional constraint may be imposed by some applications.

In one embodiment, the objective function minimizes the number of copies of a link type (Min multiplicities) used to satisfy the load. All of the above heuristics may be implemented to take a specific maximum time to execute per arc. Note that without the assumptions of unit cost drop for bigger quantities and capacities that are multiples of each other, finding the optimal solution would involve solving a computationally difficult Knapsack problem (using constrained optimization programs).

Figure 3:
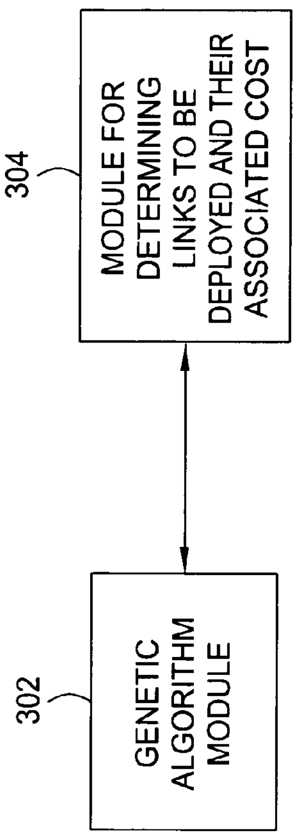
FIG. 3 illustrates interaction between modules for genetic algorithm and composite link design.

FIG. 3 broadly illustrates the interaction between module 302 used to implement the genetic algorithm and module 304 used for determining composite link assignments and associated costs. In one embodiment, module 302 provides to module 304 a vector of weights assigned to each arc, the load l and the objective function for minimizing. The objective function may be provided as selecting one of the heuristics discussed above such as minimize cost, capacity, etc. Module 304 then determines the set of links to be deployed and the associated cost (if needed). In one embodiment, the result is forwarded back to module 302. Module 302 receives the results and assigns another set of weights for the next iteration and so on.

Figure 4A:
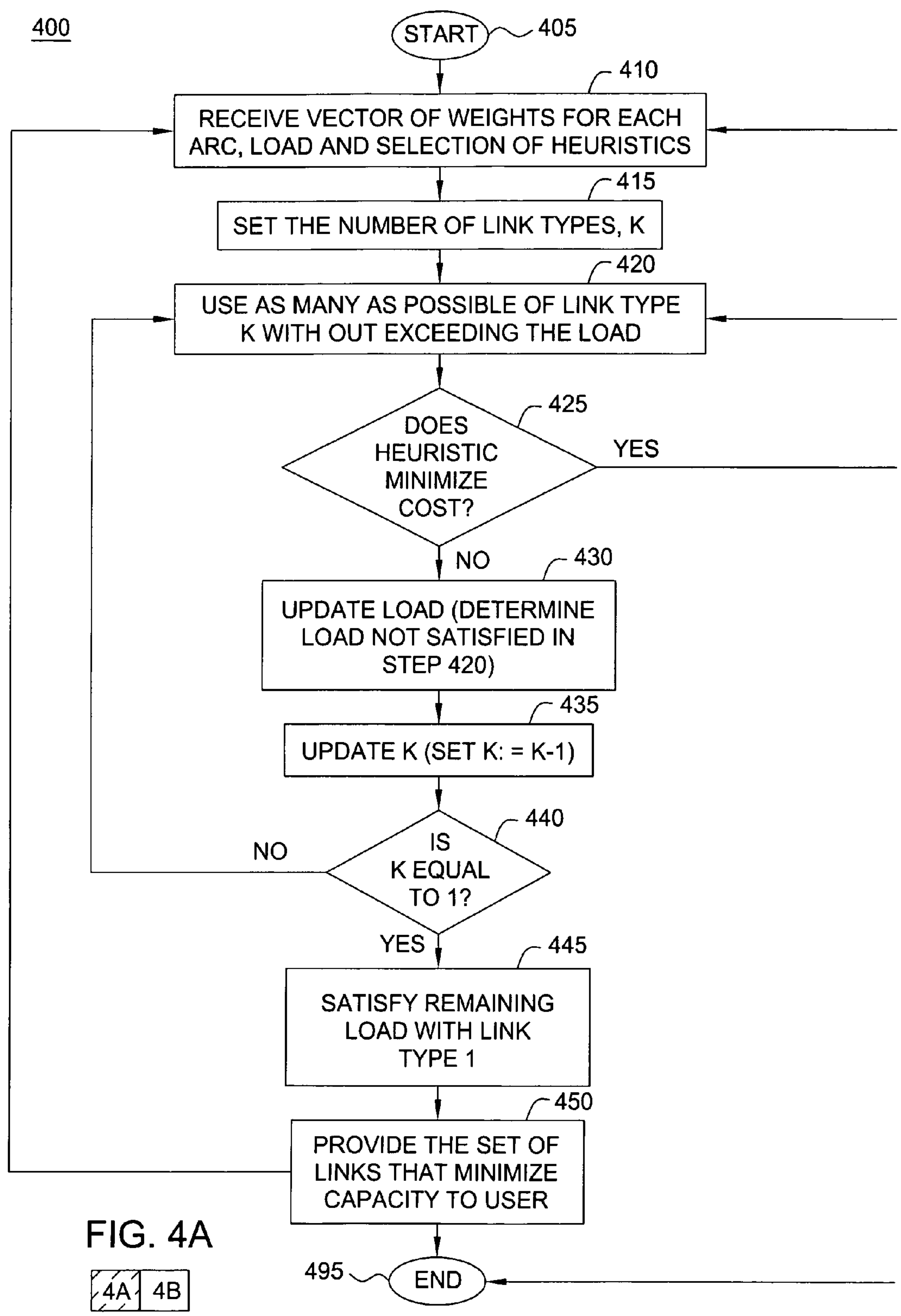
FIG. 4 illustrates a flowchart of a method for providing composite link assignment in a network design.
Figure 4B:
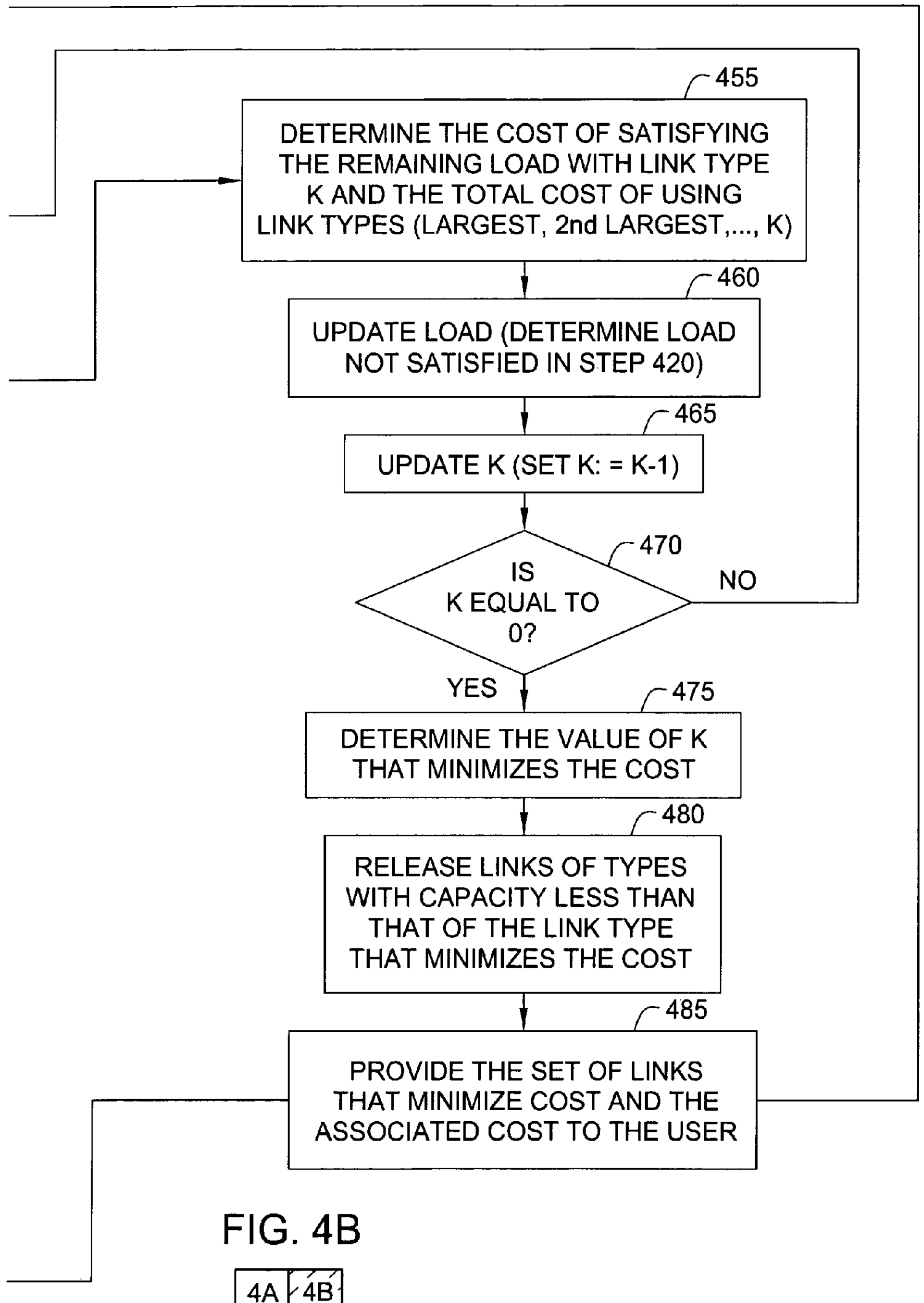

FIG. 4 illustrates a flowchart of a method 400 for providing composite link assignment in a network design. For example, the network designer may implement the present invention for composite link assignment in a server and provides the server the capacity and price information. For example, the link types are numbered 1, 2, . . . T from least capacity link to largest capacity link. The network designer provides the capacity $c_i$ and the price per unit of length $p_i$ for each link type i. For example, the network designer may provide a table as illustrated below in Table 1:

TABLE 1

| Link Type | Capacity | Price Factor |
|---|---|---|
| 1 | 155 Mb/s | 1 |
| 2 | 622 Mb/s | 3 times price of link type 1 |
| 3 | 2.5 Gb/s | 9 times price of link type 1 |
| 4 | 10 Gb/s | 27 times price of link type 1 |

Recall that $(p_T/c_T)<(p_{T-1}/c_{T-1})< \ldots <(p_1/c_1)$ for given capacities $c_1<c_2< \ldots <c_T$ and prices $p_1<p_2< \ldots <p_T$. The above inequalities take into account the fact that unit cost drops for bigger quantities in real world applications. The network designer then enables the server to be accessed by users or other servers for providing the vector of weights for each arc, load and selection of heuristics.

Method 400 starts in step 405 and proceeds to step 410. In step 410, method 400 receives vector of weights for each arc, load l (e.g., actual or expected load) and selection of heuristics. The initial values for weights might be selected based on expert analysis. For example, an arc connecting a source router to a destination router without going through another router may have a weight two times that of an arc through an intermediate router. In one embodiment, the load can be selected based on the need for providing a survivable network. For example, if the design includes full recovery after an arc failure, the remaining arcs must have enough capacity to transport all traffic despite the failure.

The selection of heuristics is determined based on the business model. In one example, the heuristic that minimizes the cost of the network may be preferred. In another example, the heuristic that minimizes the capacity may be preferred. Those skilled in the art will realize that there are other heuristics that may be incorporated and offered to the user as an option. For example, a heuristic that minimizes cost with the additional constraint on the number of link types, etc.

In step 415, method 400 sets or receives a selection of the number of link types. In one embodiment, the number of allowed link types for the network design k is the same as all the link types available. For the above example, there are 4 link types and the selected heuristics may allow using all 4 link types, e.g. k=T=4.

In another embodiment, the number of link types may be limited. For the above example, if the user prefers to limit the number of link types to less than 4, then k is set to the number specified by the user.

In step 420, method 400 uses as many as possible of the link type k without exceeding the load l. In one embodiment, the heuristic algorithm uses the biggest capacity link type to take into account the fact that unit cost drops for bigger quantities in real world applications. The quantity may be determined by calculating the value of the Floor function at $l/c_T$, denoted by $\lfloor l/c_T \rfloor$. The Floor of (x) is the largest integer less than or equal to x. For example, if the load is 10.1 Gb/s and the largest link type has capacity of 10 Gb/s, then the algorithm uses one link of the 10 Gb/s type. The method then proceeds to step 425.

In step 425, method 400 determines whether or not the heuristic minimizes cost. If the heuristic minimizes cost, then the method proceeds to step 455 to compute cost. However, if the heuristic minimizes capacity, then the method proceeds to step 430.

In step 430, method 400 updates the load. In other words, the method determines the portion of the load that is not satisfied in step 420. The update may be done by evaluating $(l:=l-c_T\lfloor l/c_T \rfloor)$. To illustrate, in the above example, the new value of the load would be equal to 0.1 Gb/s=10.1 Gb.s−10 Gb/s (1). Namely, the portion of the load that is not satisfied is 0.1 Gb/s in this example.

In step 435, method 400 updates k in order to repeat the operation on the next link type, e.g., a next lower link type. Thus, the method sets k:=k−1. For the example above, after the 10 Gb/s link type is operated on, the method proceeds to repeat the operation on the 2.5 Gb/s link type by setting k=4−1=3.

In step 440, method 400 determines whether or not k=1. If k=1, then the method proceeds to step 445 to satisfy the remaining load with the smallest capacity link type (e.g., link type 1). Otherwise, the method proceeds back to step 420 to satisfy the load with as many as possible links of type k In step 445, method 400 satisfies the remaining load by using link type 1. The number of units of link type 1 may be determined by evaluating the Ceiling function at $l/c_1$, denoted by $\lceil l/c_1 \rceil$. The Ceiling of (x) is equal to the smallest integer greater than or equal to x. The method then proceeds to step 450.

In step 450, method 400 provides the set of links that minimizes capacity to the user. The method then proceeds to step 410 to receive a new vector of weights and/or load or proceeds to step 495 to end the current process.

In step 455, method 400 determines the cost of satisfying the remaining load with link type k, and the total cost $\pi(k)$ of using link types T, T−1, . . . , k. For the above example with a load of 10.1 Gb/s, in the first iteration, the remaining load can be satisfied with a 10 Gb/s link. AS such, the total cost $\pi(4)$ would include the cost of two 10 Gb/s links. The method then proceeds to step 460 to update the load.

In step 460, method 400 updates the load. In other words, the method determines the portion of the load that is not satisfied in step 420. The update may be done by evaluating $(l:=l-c_T\lfloor l/c_T \rfloor)$. In the above example, the new value of the load would be equal to 0.1 Gb/s=10.1 Gb.s−10 Gb/s (1). Namely, the portion of the load that is not satisfied is 0.1 Gb/s in this example.

In step 465, method 400 updates k in order to repeat the operation on the next link type. Thus, the method sets k:=k−1. For the example above, after the 10 Gb/s link type is operated on, the method proceeds to repeat the operation on the 2.5 Gb/s link type by setting k=4−1=3.

In step 470, method 400 determines whether or not k=0. If k=0, then the method proceeds to step 475. Otherwise, the method proceeds back to step 420 to satisfy the load with as many as possible links of type k.

In step 475, method 400 determines the value of k that minimizes the cost. The value of k may be determined by evaluating $k^*=\text{argmin}\ \{\pi(k)\}$. The function "argmin" is the value of a given argument for which the value of the expression inside the parenthesis attains its minimum value.

In step 480, method 400 releases links of types k*−1, . . . , 1 and uses link type k* for remaining load. For the example above, if the cost is minimized for k*=4, only 10 Gb/s link types would be used and the other link types are released. The remaining capacity is satisfied with 10 Gb/s link type. In one embodiment, step 480 is an optional step.

In step 485, method 400 provides the set of links and associated cost to the user. The method then proceeds to step 410 to receive a new set of weights and/or load or to step 495 to end the current process.

Figure 5:
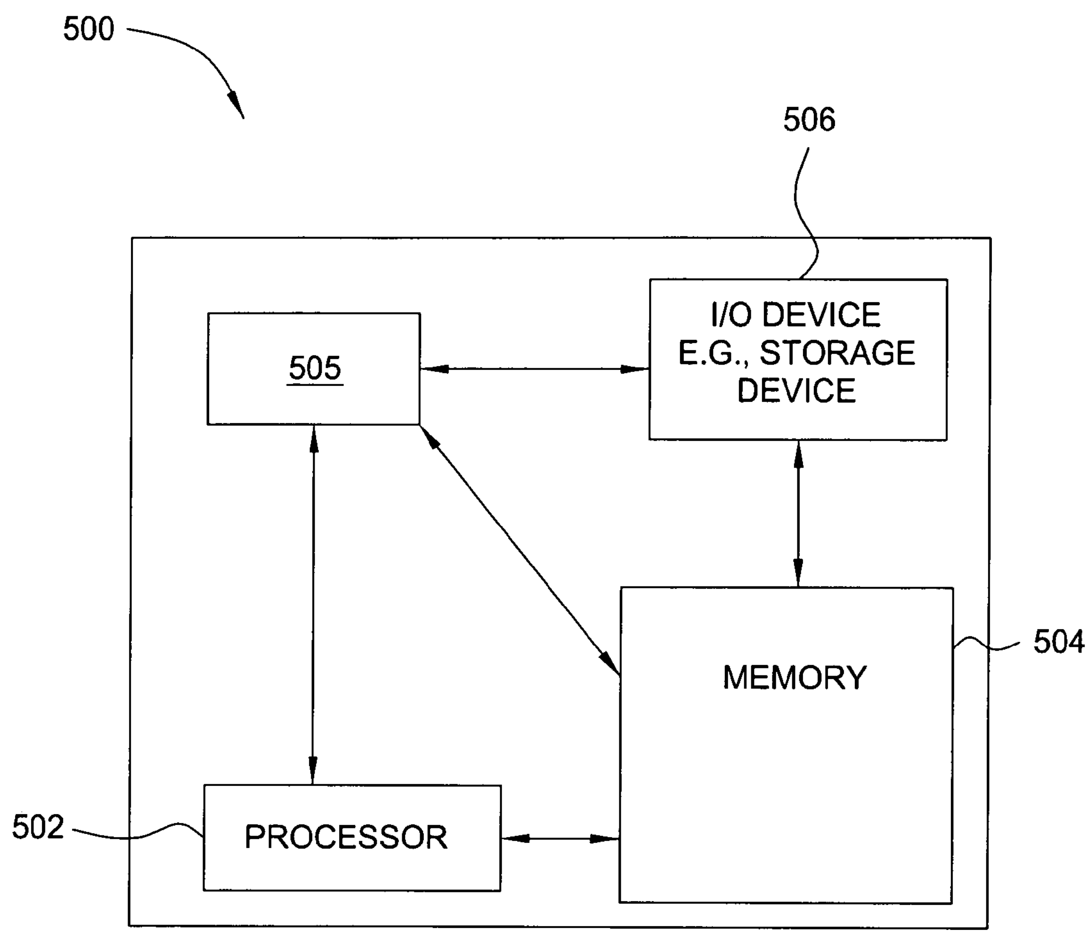
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing composite link assignment in a network design, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing composite link assignment in a network design can be loaded into memory 504 and executed by processor 502 to implement the functions as discussed above. As such, the present method 505 for providing composite link assignment in a network design (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a composite link assignment for a network having a plurality of arcs, comprising:

receiving via a server a plurality of weights for said plurality of arcs and a load for said network;

receiving via said server an objective function for minimization; and determining via said server said composite link assignment to handle said load while said objective function is minimized, where said composite link assignment comprises a plurality of different link types for at least one of said plurality of arcs, wherein said objective function comprises at least one of:

a heuristic that favors a use of as much as possible of a biggest capacity link type from said plurality of different link types without exceeding said load, a heuristic that minimizes a network cost that is defined by a sum of costs of said plurality of arcs, a heuristic that minimizes a network cost with a constraint of a specific number of said plurality of different link types, or a heuristic that minimizes a number of copies of a link type from said plurality of different link types that is used to satisfy said load.

2. The method of claim 1, wherein said network is an Internet Protocol network.

3. The method of claim 1, wherein said network employs a shortest path based routing protocol.

4. The method of claim 1, wherein said determining said composite link assignment accounts for at least one failure in said network.

5. A computer-readable volatile or non-volatile storage medium having stored thereon a plurality of instructions, the plurality of instructions including instructions which, when executed by a processor, cause the processor to perform the steps of a method for providing a composite link assignment for a network having a plurality of arcs, comprising:

receiving a plurality of weights for said plurality of arcs and a load for said network;

receiving an objective function for minimization; and determining said composite link assignment to handle said load while said objective function is minimized, where said composite link assignment comprises a plurality of different link types for at least one of said plurality of arcs, wherein said objective function comprises at least one of:

a heuristic that favors a use of as much as possible of a biggest capacity link type from said plurality of different link types without exceeding said load, a heuristic that minimizes a network cost that is defined by a sum of costs of said plurality of arcs, a heuristic that minimizes a network cost with a constraint of a specific number of said plurality of different link types, or a heuristic that minimizes a number of copies of a link type from said plurality of different link types that is used to satisfy said load.

6. The computer-readable medium of claim 5, wherein said network is an Internet Protocol network.

7. The computer-readable medium of claim 5, wherein said network employs a shortest path based routing protocol.

8. The computer-readable medium of claim 5, wherein said determining said composite link assignment accounts for at least one failure in said network.

9. An apparatus for providing a composite link assignment for a network having a plurality of arcs, comprising:

means for receiving a plurality of weights for said plurality of arcs and a load for said network;

means for receiving an objective function for minimization; and means for determining said composite link assignment to handle said load while said objective function is minimized, where said composite link assignment comprises a plurality of different link types for at least one of said plurality of arcs, wherein said objective function comprises at least one of:

a heuristic that favors a use of as much as possible of a biggest capacity link type from said plurality of different link types without exceeding said load.

a heuristic that minimizes a network cost that is defined by a sum of costs of said plurality of arcs, a heuristic that minimizes a network cost with a constraint of a specific number of said plurality of different link types, or a heuristic that minimizes a number of copies of a link type from said plurality of different link types that is used to satisfy said load.

10. The apparatus of claim 9, wherein said network employs a shortest path based routing protocol.

11. The apparatus of claim 9, wherein said determining means determines said composite link assignment by accounting for at least one failure in said network.

* * * * *